(12) United States Patent
Batta et al.

(10) Patent No.: US 11,487,937 B2
(45) Date of Patent: *Nov. 1, 2022

(54) LOCATION QUERY PROCESSING AND SCORING

(71) Applicant: Verizon Patent and Licensing Inc., Basking Ridge, NJ (US)

(72) Inventors: Andrew Batta, Broomfield, CO (US); Carolyn Vlach, Aurora, CO (US); Chad Kearney, Denver, CO (US); Jonathan Harahush, Golden, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 168 days.

This patent is subject to a terminal disclaimer.

(21) Appl. No.: 16/948,217

(22) Filed: Sep. 9, 2020

(65) Prior Publication Data

US 2020/0401642 A1 Dec. 24, 2020

Related U.S. Application Data

(63) Continuation of application No. 15/877,076, filed on Jan. 22, 2018, now Pat. No. 10,783,204.

(51) Int. Cl.
| | |
|---|---|
| *G06F 16/90* | (2019.01) |
| *G06F 40/205* | (2020.01) |
| *G10L 15/18* | (2013.01) |
| *G06F 16/9537* | (2019.01) |
| *G06F 16/2458* | (2019.01) |
| *G06F 16/9535* | (2019.01) |
| *G06F 16/2457* | (2019.01) |

(52) U.S. Cl.
CPC ........ *G06F 40/205* (2020.01); *G06F 16/2462* (2019.01); *G06F 16/24578* (2019.01); *G06F 16/9535* (2019.01); *G06F 16/9537* (2019.01); *G10L 15/1822* (2013.01)

(58) Field of Classification Search
CPC ............ G06F 16/9535; G06F 16/9537; G06F 16/2462; G06F 16/24578; G06F 40/205; G10L 15/1822

See application file for complete search history.

(56) References Cited

U.S. PATENT DOCUMENTS

| | | | |
|---|---|---|---|
| 9,234,763 B1 * | 1/2016 | Savvopoulos | ..... G01C 21/3484 |
| 9,600,529 B2 | 3/2017 | Cheng et al. | |
| 2005/0065916 A1 | 3/2005 | Ge et al. | |
| 2011/0055189 A1 * | 3/2011 | Effrat | .................. G06F 16/3322 |
| | | | 707/706 |
| 2011/0083167 A1 | 4/2011 | Carpenter et al. | |

(Continued)

*Primary Examiner* — Jau Shya Meng (57) ABSTRACT

A device can include one or more processors to: receive a query; determine a plurality of candidate samples based on the query, a candidate sample, of the plurality of candidate samples, having a location portion of zero or more tokens and an objective portion of zero or more tokens; determine a score for the candidate sample based on a data structure, the score being determined based on at least one of: a location value, associated with the location portion, that is identified using the data structure, or an objective value, associated with the location portion, that is identified using the data structure; and perform an action with regard to the query based on the score.

20 Claims, 5 Drawing Sheets

(56) References Cited

U.S. PATENT DOCUMENTS

| | | |
|---|---|---|
| 2013/0159310 A1* | 6/2013 | Birdwell ............ G06F 16/3331 707/758 |
| 2014/0250119 A1 | 9/2014 | Bhattiprolu et al. |
| 2014/0351088 A1 | 11/2014 | Saxena |
| 2015/0356088 A1 | 12/2015 | Berkhin et al. |
| 2016/0103893 A1* | 4/2016 | Rubinstein ........ G06F 16/24575 707/732 |
| 2016/0350426 A1* | 12/2016 | Wu .................... G06F 16/3322 |
| 2018/0196822 A1* | 7/2018 | Lewin-Eytan ...... G06F 16/3322 |
| 2018/0231391 A1* | 8/2018 | Yang .................... G06N 20/00 |

\* cited by examiner

LOCATION QUERY PROCESSING AND SCORING

RELATED APPLICATION

This application is a continuation of U.S. patent application Ser. No. 15/877,076, entitled "LOCATION QUERY PROCESSING AND SCORING," filed Jan. 22, 2018, which is incorporated herein by reference.

BACKGROUND

A user of a navigation application can input a query that identifies a navigation destination or information for determining a navigation destination. For example, the query can include information identifying a location (e.g., Anchorage, Ak.), an objective (e.g., hotels, hot dog stands, a particular hotel name, etc.), or a location and an objective (e.g., hot dog stands Anchorage Ak.).

DETAILED DESCRIPTION OF PREFERRED EMBODIMENTS

The following detailed description of example implementations refers to the accompanying drawings. The same reference numbers in different drawings can identify the same or similar elements.

Navigation systems (e.g., phone navigation apps, global positioning system (GPS) units, etc.) can support navigation searching using natural language entries. For example, a user can input a natural language query, and the navigation system can parse the natural language query to determine a desired destination of the user. The navigation system can determine navigation information, such as a route, based on the desired destination, and can provide the navigation information to a user device associated with the user.

In one example, a query can include information associated with a location (e.g., "where" a destination is located) and an objective (e.g., "what" the destination includes). For example, if a user wants to find hotels in Pasadena, Calif., the user might input "hotels Pasadena Calif." Similarly, if a user wants to find a particular brand of hotel in Pasadena, Calif., the user might input "Embassy Suites Pasadena Calif." In these cases, the objective is "hotels" and "Embassy Suites" and the location, in both cases, is "Pasadena Calif."

However, it can be difficult to parse natural language to determine the location and the objective. For example, the user (or different users) can input the location and the objective in a varying order (e.g., location first or objective first). As another example, it can be unclear where a location portion of a query ends and an objective portion begins (e.g., does Boston Market refer to a market in Boston or a deli named Boston Market?). As yet another example, some queries can include only one of an objective portion or a location portion.

Some implementations described herein receive a query and determine multiple candidate samples based on the query. Each candidate sample can have a different split of location information and objective information. Implementations described herein can determine scores for the candidate samples based on a data structure that indicates past usage of terms of the candidate samples as locations or as objectives. For example, the data structure can identify points of interest, categorizations of the points of interest as locations and/or objectives, and/or scores or values of the points of interest as locations and/or objectives. The scores can indicate which candidate sample is most likely to have an accurate split of the location information and the objective information according to the data structure.

In this way, a probabilistic approach based on a point-of-interest data structure (e.g., database) is used to identify an appropriate split between a location portion and an objective portion of a query. Thus, accuracy of natural language query processing is improved, thereby reducing wasted resources (e.g., processor resources, network resources, etc.) associated with providing navigation information based on inaccurate parses. Furthermore, this approach can be efficient at training time (e.g., when the data structure is created) and at parsing time (e.g., when the candidate samples are scored) in comparison to other techniques, as described in more detail elsewhere herein. This can be beneficial for large point-of-interest databases associated with large geographical areas, which can include hundreds, millions, or billions of data points. Still further, some implementations described herein provide an improvement to a technical field (e.g., natural language parsing of textual search queries).

Figure 1A:
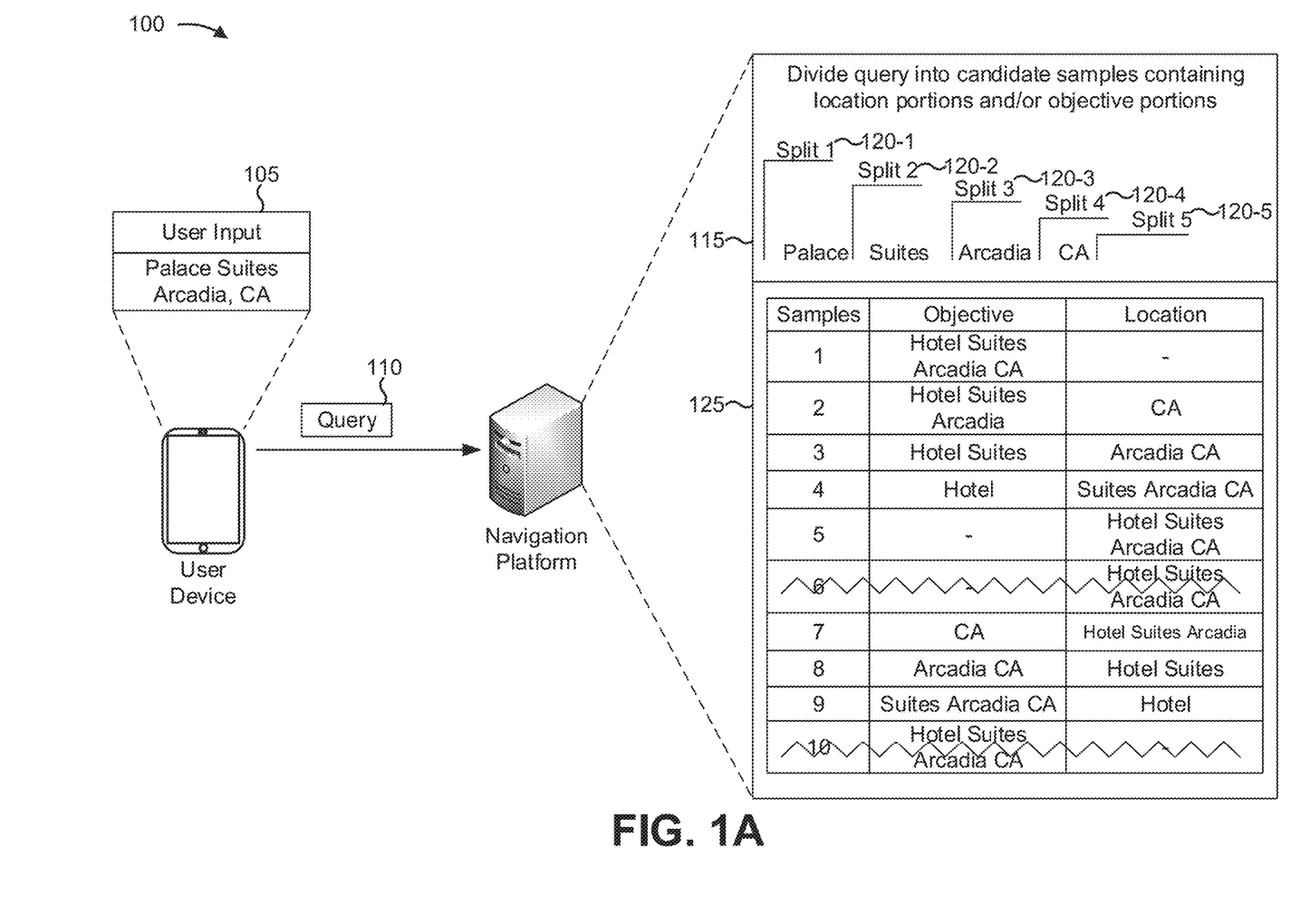
FIGS. 1A and 1B are diagrams of an overview of an example implementation described herein.
Figure 1B:
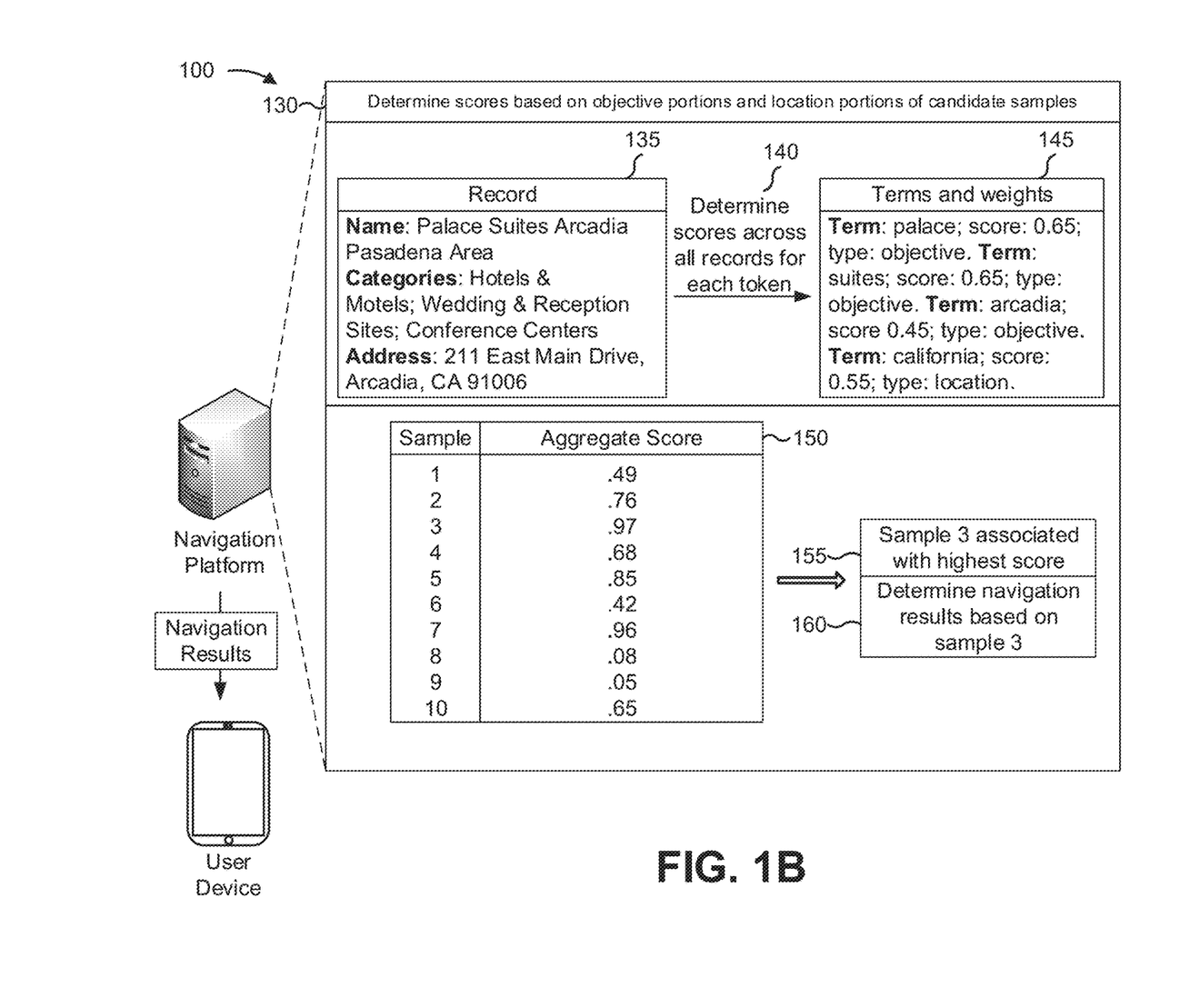

FIG. 1 is a diagram of an overview of an example implementation 100 described herein. As shown, FIG. 1 includes a user device, which can be similar to user device 210 described below. Furthermore, FIG. 1 includes a navigation platform, which can be similar to navigation platform 220 described below.

As shown in FIG. 1, and by reference number 105, a user device can receive user input identifying a query. For example, the query can relate to a navigation destination for which a user of the user device desires navigation instructions. The user input can include voice input, text input, an instruction from a webpage, or any other input. Furthermore, the user device can receive the query in a fashion other than by user input.

As further shown, the query includes "Palace Suites Arcadia, Calif." For example, the user can be searching for navigation instructions to a location called "Palace Suites" in Arcadia, Calif. As described herein, the Palace Suites portion of the query can be termed an objective portion, since the Palace Suites portion identifies an objective of the query (e.g., "what" the user is searching for). Furthermore, the Arcadia, Calif. portion of the query can be termed a location portion, since the Arcadia, Calif. portion identifies a location associated with the query (e.g., "where" the objective is potentially located according to the user). Notably, the query, in the form in which the query is received by the user device, does not indicate which portion is the objective portion and which portion is the location portion, or where the objective portion and/or the location portion begin and end. Implementations described herein identify a most likely objective portion and location portion, as described in more detail below.

As shown by reference number 110, the user device can provide the query to or toward a navigation platform. The navigation platform can include one or more devices that process queries to determine a most likely objective portion and/or location portion, as described in more detail elsewhere herein.

As shown by reference number 115, the navigation platform can divide the query into a plurality of candidate samples. Each candidate sample can include at least one of a location portion or an objective portion. For example, the navigation platform can identify a plurality of tokens in the query, and can apply various splits between the tokens. Here, the tokens can include "palace," "suites," "Arcadia," and "CA." The splits are shown by reference numbers 120-1 through 120-5. As shown, splits 120-1 and 120-5 are not between tokens. Because of this, some candidate samples include only one of an objective portion or a location portion.

The navigation platform can determine an objective portion and a location portion of each candidate sample. The objective portions and the location portions are shown in the table indicated by reference number 125. The table shown by reference number 125 shows each possible configuration of the objective portion and the location portion. For example, in sample 2, a first portion (e.g., Hotel Suites Arcadia) is used as an objective portion, and in sample 7, the first portion is used as the location portion. Furthermore, duplicate samples (e.g., samples 6 and 10) can be removed, thereby conserving processor resources that would otherwise be used to determine scores for such samples.

As shown in FIG. 1B, and by reference number 130, the navigation platform can determine scores for the candidate samples based on the objective portions and the location portions of each candidate sample. The navigation platform can use a data structure to determine the scores. The data structure can identify points of interest (e.g., tokens), weights associated with the tokens, and types of the tokens (and/or the weights) indicating whether the tokens are associated with a location or an objective.

As shown by reference number 135, as one example, a record for a particular objective (e.g., Palace Suites Arcadia Pasadena Area) identifies a name of the objective, categories associated with the objective, and a location of the objective (e.g., an address, coordinates, etc.). As shown by reference number 140, the navigation platform can determine scores, across all records, for each token. For example, a score for a token can indicate a likelihood that the token is associated with an objective (or a location).

As shown by reference number 145, the navigation platform can determine scores for terms of the sample. For example, "palace" is associated with a score of 0.65 with regard to an objective type, which can indicate that "palace" is defined as an objective in 65 percent of instances in the data structure. As another example, "california" is associated with a score of 0.55 with regard to location, indicating that "california" is defined as a location in 55 percent of instances.

As shown by reference number 150, the navigation platform can determine aggregate scores for each candidate sample based on the scores for the terms (e.g., tokens) of each candidate sample. For example, when a token is included in an objective portion of a candidate sample, the navigation platform can use a score or value associated with the token when defined as an objective. When a token is included in a location portion of a candidate sample, the navigation platform can use a score or value associated with the token when defined as a location. The navigation platform can determine the aggregate scores for each candidate sample based on combining the scores or values associated with each candidate sample, as described in more detail elsewhere herein.

As shown by reference number 155, the navigation platform can determine that a particular candidate sample (e.g., sample 3) is associated with a highest score. This can indicate that sample 3 is most likely to have a correct location portion and objective portion in comparison to the other candidate samples. As shown by reference number 160, the navigation device can determine navigation results based on sample 3, and can provide the navigation results to the user device.

In this way, a probabilistic approach based on a point-of-interest data structure (e.g., database) is used to identify an appropriate split between a location portion and an objective portion of a query. Thus, accuracy of natural language query processing is improved, thereby reducing wasted resources (e.g., processor resources, network resources, etc.) associated with providing navigation information based on inaccurate parses. Furthermore, this approach can be efficient at training time (e.g., when the data structure is created) and at parsing time (e.g., when the candidate samples are scored) in comparison to other techniques, as described in more detail elsewhere herein. This can be beneficial for large point-of-interest databases associated with large geographical areas, which can include hundreds, millions, or billions of data points. Still further, some implementations described herein provide an improvement to a technical field (e.g., natural language parsing of textual search queries).

As indicated above, FIG. 1 is provided merely as an example. Other examples are possible and can differ from what was described with regard to FIG. 1.

Figure 2:
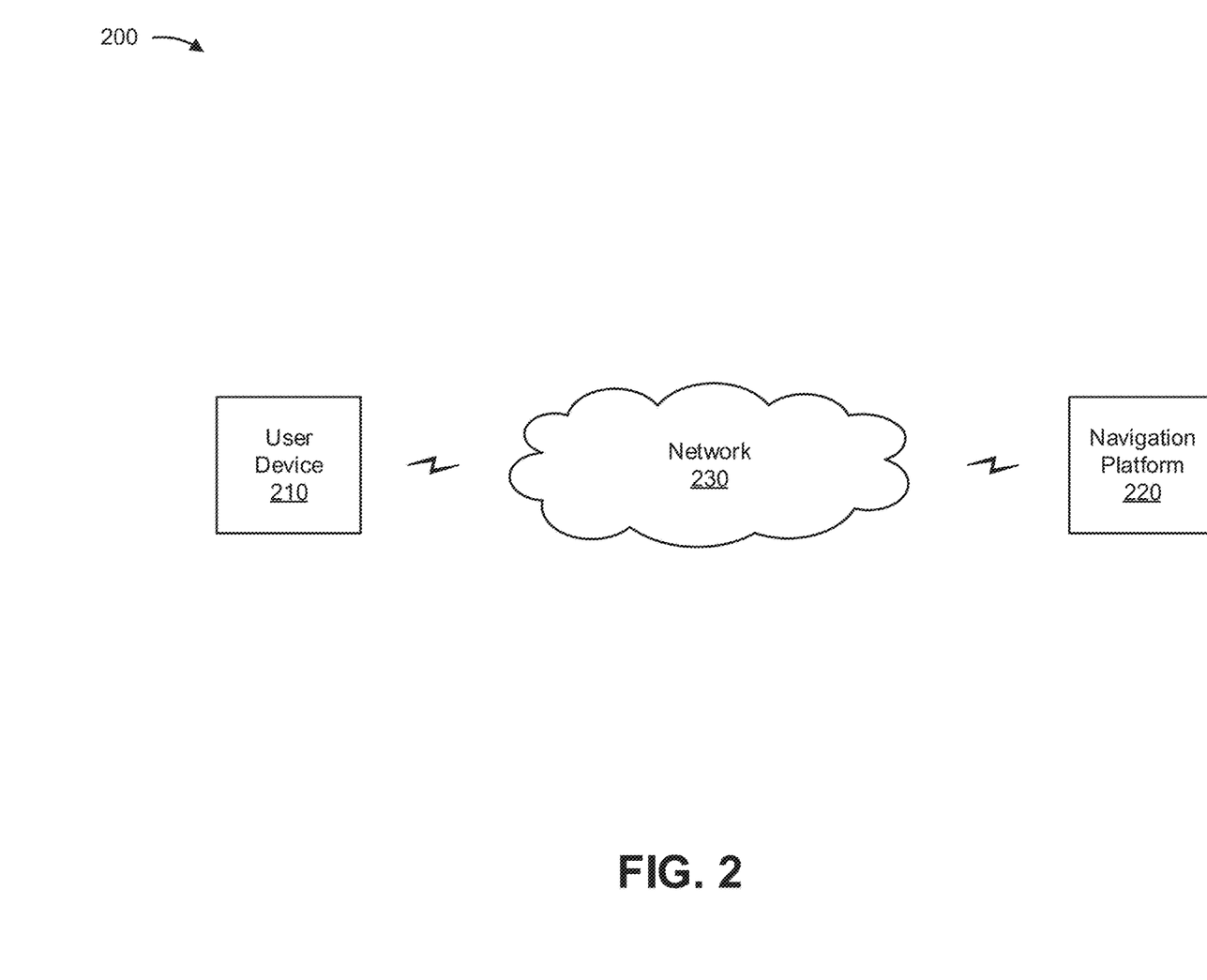
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a navigation platform 220, and a network 230. Devices of environment 200 can interconnect via wired connections, wireless connections, or a combination of wired and wireless connections.

User device 210 includes one or more devices capable of receiving, generating, storing, processing, and/or providing information associated with a query. For example, user device 210 can include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), and/or a similar type of device.

Navigation platform 220 includes one or more devices capable of storing, processing, and/or routing information associated with navigation, such as a query and/or a data structure identifying locations and objectives. In some implementations, navigation platform 220 can include a communication interface that allows navigation platform 220 to receive information from and/or transmit information to other devices in environment 200.

Network 230 includes one or more wired and/or wireless networks. For example, network 230 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
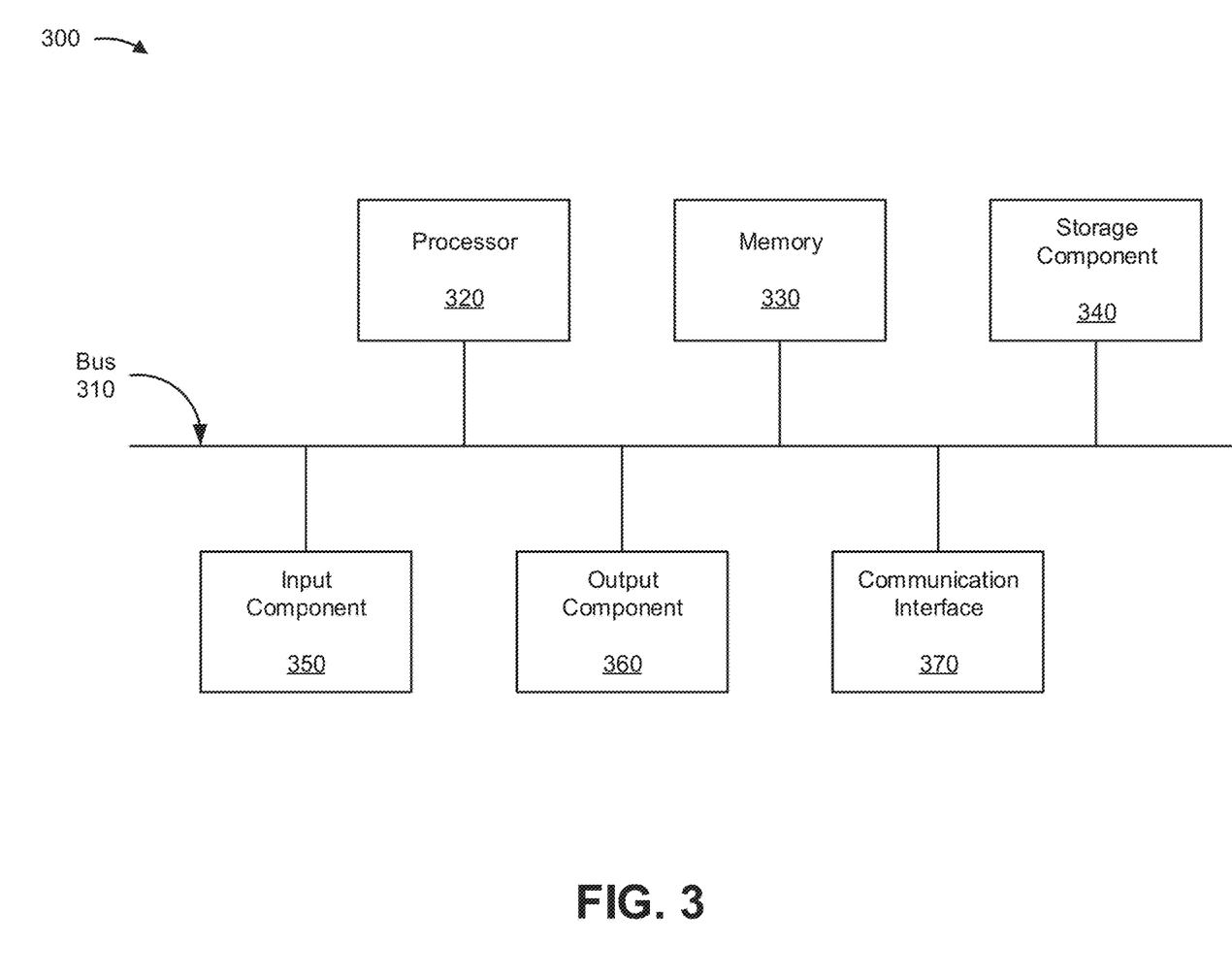
FIG. 3 is a diagram of example components of one or more devices of FIG. 2.

FIG. 3 is a diagram of example components of a device 300. Device 300 can correspond to user device 210 and navigation platform 220. In some implementations, user device 210 and/or navigation platform 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes one or more memories, such as a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
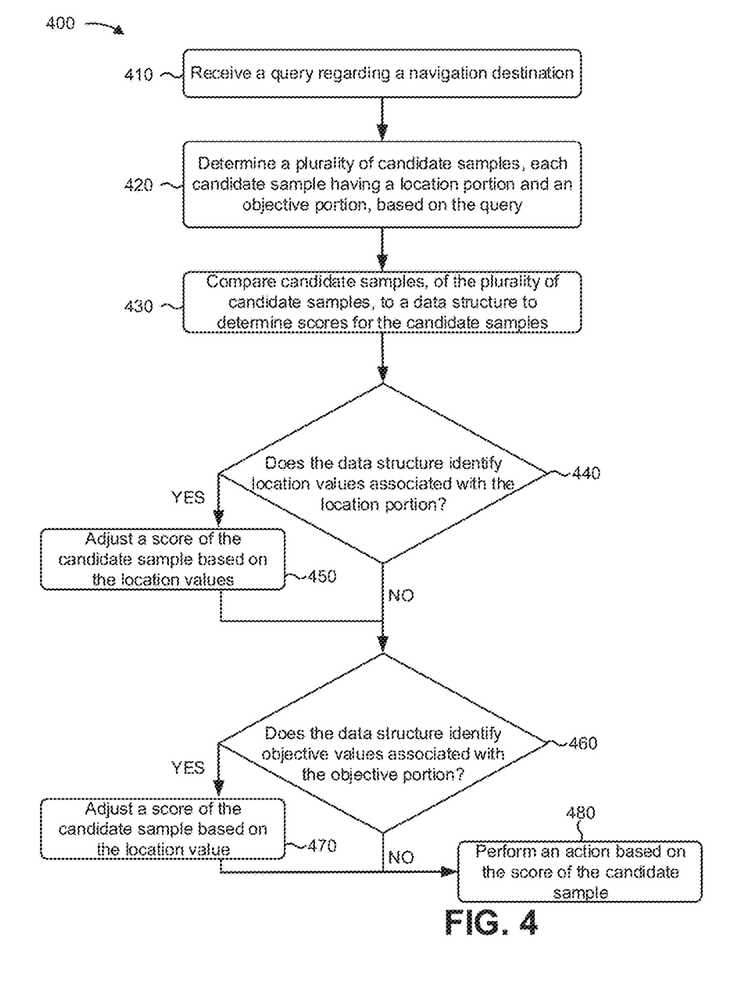
FIG. 4 is a flow chart of an example process for determining a score based on a location portion and/or an objective portion of a query.

FIG. 4 is a flow chart of an example process 400 for determining a score based on a location portion and/or an objective portion of a query. In some implementations, one or more process blocks of FIG. 4 can be performed by navigation platform 220. In some implementations, one or more process blocks of FIG. 4 can be performed by another device or a group of devices separate from or including navigation platform 220, such as user device 210.

As shown in FIG. 4, process 400 can include receiving a query regarding a navigation destination (block 410). For example, navigation platform 220 (e.g., processor 320) can receive a query (e.g., from user device 210, from a server device, etc.). The query can relate to a navigation destination. For example, the query can be a search query, inputted by a user, to identify a navigation destination. In some implementations, the query can include at least one of a location portion or an objective portion. For example, the query can potentially be split into the location portion and the objective portion. The location portion can identify a location associated with the navigation destination and the objective portion can identify an objective associated with the navigation destination. Navigation platform 220 can receive the query to determine the location portion and/or the objective portion. For example, navigation platform 220 can receive the query to determine a most likely split between the location portion and the objective portion, a set of most likely splits between the location portion and the objective portion, and/or the like.

The query can include one or more strings. A string can include one or more alphanumerical characters. For example, a query "Saks 5th Avenue Lexington, Ky." can include strings of Saks, 5th, and so on. Similarly, a query "123 Main Street" can include strings of 123, Main, and Street. In some implementations, navigation platform 220 can determine tokens based on each string. A token can be equal to a string. For example, the query "Saks 5th Avenue Lexington, Ky." includes five tokens. The use of tokens can enable navigation platform 220 to determine location values and objective values for multiple candidate samples of a query based on a single pass over a data structure, as described in more detail below.

As further shown in FIG. 4, process 400 can include determining a plurality of candidate samples, each candidate sample having a location portion and an objective portion, based on the query (block 420). For example, navigation platform 220 can determine a plurality of candidate samples based on the query. Each candidate sample can have a respective location portion and a respective objective portion. For example, the location portion and the objective portion can each be a contiguous substring of the query (assuming that the location portion and the objective portion are not null). In some implementations, each candidate sample can be associated with different location portions and different objective portions. Additionally, or alternatively, two or more candidate samples can be associated with a same location portion and/or a same objective portion. The location portion and the objective portion can each include zero or more tokens. For example, a candidate sample can include a location portion and an objective portion that each have one or more tokens, or a candidate sample can include only one of the location portion or the objective portion. Thus, versatility of navigation platform 220 is improved when a search query can or might not include a location portion or an objective portion (e.g., Boston Market).

Navigation platform 220 can determine the plurality of candidate samples based on splitting the search query in a plurality of different configurations. For example, consider the query "Pools Washington, D.C." In this case, the query can be split in four places: before "pools," before "Washington," before "D.C.," and after "D.C." For a first set of candidate samples, a portion before a particular split can be used as a location portion and a portion after the particular split can be used as an objective portion. For a second set of candidate samples, the portion before the particular split can be used as the objective portion and the portion after the particular split can be used as the location portion. In a case where a split occurs before a first token or after a last token of a query, a corresponding candidate sample can include only one of the location portion or the objective portion.

In some implementations, navigation platform 220 can determine a candidate sample based on one or more tokens of the candidate sample. For example, assume that a query includes a preposition (e.g., "Barber in Peoria, Ill."). In that case, it can be more likely that the split between portions occurs at the preposition (e.g., in) than elsewhere in the query. Thus, navigation platform 220 can determine a candidate sample based on the preposition. For example, navigation platform 220 can remove the preposition and can place the split of the candidate sample at a location of the preposition.

In some implementations, navigation platform 220 can process or normalize a query. For example, navigation platform 220 can remove punctuation, can perform stemming, can perform case-folding, and/or the like. In some implementations, navigation platform 220 can determine a term form for a particular token. For example, navigation platform 220 can map all four-digit tokens to a term form of "four-digit numbers." This can improve accuracy of determination of scores or values for such tokens, and can reduce a negative effect of a particular esoteric term (e.g., a particular four-digit number) that is not associated with a significant amount of data as a point of interest.

In some implementations, navigation platform 220 can determine candidate samples based on a prior probability associated with an orientation of the candidate samples. As used herein, orientation can refer to which portion, of the objective portion and the location portion, occurs first in the query. In some implementations, the prior probability can be based on an orientation associated with user device 210 or an account or user of user device 210. For example, if the user has historically used a particular orientation for queries (e.g., location first or objective first), navigation platform 220 can determine one or more candidate samples according to the particular orientation. In some implementations, navigation platform 220 can adjust a score of one or more candidate samples based on the particular orientation. For example, navigation platform 220 can increase a score of a particular sample when the particular sample has the particular orientation. By configuring and/or scoring candidate samples based on prior probabilities, accuracy of parsing of queries can be improved, and processor resources can be conserved that would otherwise be used to score inaccurate or unlikely candidate samples.

In some implementations, navigation platform 220 can determine a candidate sample based on a numerical token (e.g., 123 in the query "123 main street"). For example, a portion that begins with a numerical token can be more likely to be a location portion than an objective portion. Therefore, navigation platform 220 can determine one or more candidate samples to include a location portion that begins with a numerical token. Similarly, if a token includes a known country code, ZIP code, and/or the like, navigation platform 220 can determine a location portion that includes the token. In this way, accuracy of scoring of candidate samples can be improved. Furthermore, processor resources can be conserved that would otherwise be used to determine scores for a less accurate set of candidate samples.

As further shown in FIG. 4, process 400 can include comparing candidate samples, of the plurality of candidate samples, to a data structure to determine scores for the candidate samples (block 430). For example, navigation platform 220 can compare candidate samples to a data structure to determine scores for the candidate samples. The data structure can identify terms and values associated with the terms. For example, the data structure can include a database that identifies points of interest (POIs) and values associated with the POIs. In some implementations, the values can include weights. For example, a term can be associated with a weight that is based on a number of searches that include the term (e.g., based on users searching for destinations, etc.). Furthermore, the data structure can indicate a weight or value for a term as an objective value and as a location value.

In some implementations, navigation platform 220 can determine scores for all candidate samples that are generated based on the query. In some implementations, navigation platform 220 can determine scores for a subset of candidate samples that are generated based on the query. For example, navigation platform 220 can eliminate duplicate samples. As another example, navigation platform 220 can eliminate samples that fit particular criteria. For example, navigation platform 220 can eliminate any sample that includes only numbers in a location portion.

In some implementations, navigation platform 220 can determine, for each token in a query, a probability that each token would appear in the objective portion of the query. To perform this determination, navigation platform 220 can use the data structure, which can identify POIs and fields associated with the POIs, such as name (e.g., an objective field), category (e.g., an objective field), and address (e.g., a location field). Navigation platform 220 can iterate over POI records, noting, for each token, whether each token appeared in an objective field or a location field. Furthermore, each token in a record can be weighted with a value that can be based on popularity of the POI with regard to users (e.g., among users of a search engine, among users that provide queries, etc.).

Navigation platform 220 can combine the values (e.g., weights) associated with each token with regard to objective fields and with regard to location fields. Navigation platform 220 can determine a score, for the token, indicating a likelihood that the token should be included in an objective portion of a query versus a location portion of a query. For example, assume that navigation platform 220 determines an objective value for a particular token of 50, and assume that navigation platform 220 determines a location value for a particular token of 100. In that case, it can be inferred that the particular token is twice as likely to be included in a location portion of a query than an objective portion of a query. Furthermore, navigation platform 220 can determine a relative probability for the token of (for example) 0.33 by dividing the objective value (or weight) (e.g., 50) by a total value or weight (e.g., 150).

Navigation platform 220 can use the relative probabilities of each token of a candidate sample to determine a score for the candidate sample. For example, assume that a candidate sample includes an objective portion of "hotel suites" and a location portion of "arcadia, ca." In that case, navigation platform 220 can combine the relative probabilities (denoted by P( )) as follows:

P("hotel" appears as an objective)*P("suites" appears as an objective)*P("arcadia" appears as a location)*P ("ca" appears as a location).

This procedure can assign a score to each candidate sample based on the likelihood that tokens of each candidate sample are in a correct portion of the candidate sample.

An advantage of such a probabilistic approach is that, in the case that two or more candidate samples are close in likelihood, the user can be interactively asked to disambiguate. For instance, given the query "boston market", navigation platform 220 can provide (e.g., for a user) a choice between "objective: (market); location: (boston)" and "objective: (boston market); location: ( )". For example, navigation platform 220 can provide an explicit choice between the two candidate samples, or the more likely candidate sample could be used to fulfill the query (e.g., perform the action), while the less likely candidate sample could be presented as an alternative option (e.g., with a visual or textual indicator, such as "do you mean . . . ?" and/or the like).

Another advantage is that navigation platform 220 can be robust to a term including a misspelling and/or a novel token or novel term. For example, such a term can be assigned a default relative probability score (e.g., 0.5), which removes an effect on classification of the candidate sample by the term. For example, given the query "embssy suites arcadia ca", setting P("embssy" appears as an objective) equal to 0.5 causes navigation platform 220 to attempt to determine the correct candidate sample using the remaining tokens of the query without having "embssy" affect the determination.

A further advantage is efficiency when the data structure is created and when scores are determined for candidate samples. At training time (e.g., when the data structure is created), a single pass through the training data, plus a single pass through the term space, can be sufficient to train the system. This computation can be readily parallelized in systems such as Hadoop or Spark. Moreover, incremental changes to the data structure can require only one additional pass through the term space. When scores are determined for candidate samples, lookups for each token can be performed using a fast key/value store, and a relatively small number of floating point computations can be performed. Thus, implementations described herein can be usable even for large data sets including millions or billions of data points (e.g., POIs).

In some implementations, navigation platform 220 can determine scores based on the operations described in connection with blocks 440 through 470, below.

As further shown in FIG. 4, process 400 can include determining whether the data structure identifies location values associated with the location portion (block 440). For example, navigation platform 220 can determine whether any token of the location portion is associated with a value or weight according to the data structure. When the data structure identifies a location value associated with the location portion (block 440—YES), then process 400 can include adjusting a score of the candidate sample based on the location value (block 450) and proceeding to block 460. For example, navigation platform 220 can determine a score for the candidate sample based on the respective location values associated with tokens of the location portion of the candidate sample.

As further shown in FIG. 4, process 400 can include determining whether the data structure identifies an objective value associated with the objective portion (block 460). For example, navigation platform 220 can determine whether the data structure identifies an objective value for tokens included in the objective portion. In some implementations, navigation platform 220 can determine whether the data structure identifies a location value for a token of the objective portion, and can determine the objective value for the token based on the location value (e.g., 1 minus the location value). As further shown in FIG. 4, when the data structure identifies an objective value associated with the objective portion (block 460—YES), then process 400 can include adjusting the score of the candidate sample based on the objective value (block 470) and proceeding to block 480. For example, navigation platform 220 can determine a score for the candidate sample based on the respective objective values associated with tokens of the objective portion of the candidate sample.

As further shown in FIG. 4, process 400 can include performing an action based on the score of the candidate samples (block 480). For example, navigation platform 220 can perform an action based on scores of the candidate samples. In some implementations, navigation platform 220 can perform an action with regard to a highest-scoring candidate sample. For example, a candidate sample with a highest (e.g., best, most optimal, etc.) score can be a candidate sample that is most likely, according to the data structure, to have a proper division of the location portion and the objective portion.

In some implementations, navigation platform 220 can perform a search based on the candidate sample. For example, navigation platform 220 can perform a search using a mapping service (e.g., Mapquest, Google Maps, etc.). In such a case, navigation platform 220 can use the location portion as a location associated with the search and the objective portion as an objective associated with the search. In some implementations, navigation platform 220 can provide information identifying the candidate sample.

For example, navigation platform 220 can provide information identifying the location portion and the objective portion. In such a case, navigation platform 220 can provide a request for a user indication that the location portion and the objective portion are accurate. Additionally, or alternatively, navigation platform 220 can determine whether the location portion and the objective portion are accurate. For example, navigation platform 220 can determine, based on whether user device 210 uses navigation information associated with the candidate sample, whether the location portion and the objective portion are accurate. When user device 210 uses the navigation information, navigation platform 220 can determine that the location portion and the objective portion are accurate. When user device 210 does not use the navigation information, navigation platform 220 can determine that the location portion and the objective portion are not accurate.

In some implementations, navigation platform 220 can provide information identifying multiple, different candidate samples. For example, navigation platform 220 can provide information identifying multiple candidate samples with a score that satisfies a threshold, or can provide information identifying candidate samples associated with a highest X scores (X greater than 1). In such a case, navigation platform 220 can provide a request for a disambiguation based on user input of which candidate sample is most accurately split.

In some implementations, navigation platform 220 can update the data structure based on the query. For example, navigation platform 220 can determine whether the selected candidate sample is accurate (e.g., whether the location portion and the objective portion are accurately identified). Navigation platform 220 can update scores or weights associated with tokens of the objective portion and the location portion. For example, navigation platform 220 can increase an objective value of tokens of the objective portion and can increase a location value of tokens of the location portion. In this way, accuracy of determination of the candidate sample is improved.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, navigation platform 220 can use a probabilistic approach based on a point-of-interest data structure (e.g., database) to identify an appropriate split between a location portion and an objective portion of a query. Thus, navigation platform 220 can improve accuracy of natural language query processing, thereby reducing wasted resources (e.g., processor resources, network resources, etc.) associated with providing navigation information based on inaccurate parses. Furthermore, this approach can be efficient at training time (e.g., when the data structure is created) and at parsing time (e.g., when the candidate samples are scored) in comparison to other techniques, as described in more detail elsewhere herein. This can be beneficial for large point-of-interest databases associated with large geographical areas, which can include hundreds, millions, or billions of data points. Still further, some implementations described herein provide an improvement to a technical field (e.g., natural language parsing of textual search queries).

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories having instructions stored therein; and one or more processors, wherein the instructions, when executed by the one or more processors, cause the one or more processors to:
receive a query;
determine a plurality of candidate samples based on the query,
wherein each candidate sample, of the plurality of candidate samples, has at least one of a location portion or an objective portion;
compare one or more candidate samples, of the plurality of candidate samples, to past usage terms of candidate samples in a plurality of records to determine scores for the one or more candidate samples, wherein the scores are determined based on:
a location value, associated with the location portion of the one or more candidate samples, and
an objective value, associated with the objective portion of the one or more candidate samples,
wherein a first score of the scores for the one or more candidate samples indicates a likelihood that the location portion is associated with a location, and
wherein a second score of the scores for the one or more candidate samples indicates a likelihood that the objective portion is associated with an objective; and
perform an action with regard to the query based on the scores.

2. The device of claim 1, wherein the query is a search query, and
wherein the search query is associated with a navigation destination.

3. The device of claim 1, wherein each candidate sample includes:
the location portion and the objective portion that each have one or more tokens, or
only one of the location portion or the objective portion.

4. The device of claim 1, wherein the plurality of candidate samples includes every possible combination of location portions and objective portions.

5. The device of claim 1, wherein a first candidate sample, of the plurality of candidate samples, includes a first set of tokens as a location portion of the first candidate sample and a second set of tokens as an objective portion of the first candidate sample, and
wherein a second candidate sample, of the plurality of candidate samples, includes the first set of tokens as an objective portion of the second candidate sample and the second set of tokens as a location portion of the second candidate sample.

6. The device of claim 1, wherein the location value and the objective value are identified in a data structure, and
wherein the data structure identifies points of interest, location values associated with the points of interest, and objective values associated with the points of interest.

7. The device of claim 6, wherein the location values associated with the points of interest and the objective values associated with the points of interest are based on popularity of the points of interest with regard to users.

8. A non-transitory computer-readable medium storing instructions, the instructions comprising:
one or more instructions that, when executed by one or more processors, cause the one or more processors to:
receive a search query;
determine a plurality of candidate samples based on the search query,
wherein each candidate sample, of the plurality of candidate samples, has at least one of a location portion and an objective portion;
compare one or more candidate samples, of the plurality of candidate samples, to past usage terms of candidate samples in a plurality of records to determine scores for the one or more candidate samples, wherein the scores are determined based on:
a location value, associated with the location portion of the one or more candidate samples, and
an objective value, associated with the objective portion of the one or more candidate samples,
wherein a first score of the scores for the one or more candidate samples indicates a likelihood that the location portion is associated with a location, and
wherein a second score of the scores for the one or more candidate samples indicates a likelihood that the objective portion is associated with an objective;
determine a candidate sample, of the one or more candidate samples, with a highest score; and
perform an action with regard to the search query based on the highest score.

9. The non-transitory computer-readable medium of claim 8, where the one or more instructions, that cause the one or more processors to perform the action, further cause the one or more processors to:
determine navigation results based on the candidate sample with the highest score.

10. The non-transitory computer-readable medium of claim 8, where the one or more instructions, when executed by the one or more processors, further cause the one or more processors to:
adjust the scores associated with the one or more candidate samples based on a particular orientation associated with the search query,
wherein the particular orientation is associated with historical use by a particular user.

11. The non-transitory computer-readable medium of claim 8, wherein the location value and the objective value are based on term forms of one or more tokens of the candidate sample.

12. The non-transitory computer-readable medium of claim 8, wherein a location value for a particular token of the search query is based on a value between zero and one, and wherein an objective value for the particular token is based on one minus the location value for the particular token.

13. The non-transitory computer-readable medium of claim 8, wherein the one or more instructions, that cause the one or more processors to perform the action, cause the one or more processors to:
provide a first candidate sample and a second candidate sample, of the plurality of candidate samples, for disambiguation based on user input.

14. The non-transitory computer-readable medium of claim 8, wherein the one or more instructions, when executed by the one or more processors, further cause the one or more processors to:
determine that a token of the search query is a novel token that has not been previously received or processed; and
assign a particular location value to the token of the search query based on the token of the search query being a novel token.

15. A method, comprising:
receiving, by a device, a query;

determining, by the device, a plurality of candidate samples based on the query, wherein each candidate sample, of the plurality of candidate samples, has:
- a respective location portion having zero or more tokens, or
- a respective objective portion having zero or more tokens;

comparing, by the device, one or more candidate samples, of the plurality of candidate samples, to past usage terms of candidate samples in a plurality of records to determine scores for the one or more candidate samples,
wherein the scores are determined based on:
- a location value, associated with a location portion of the one or more candidate samples, and
- an objective value, associated with an objective portion of the one or more candidate samples, wherein a first score of the scores for the one or more candidate samples indicates a likelihood that the location portion is associated with a location, and
wherein a second score of the scores for the one or more candidate samples indicates a likelihood that the objective portion is associated with an objective;
determining, by the device, a candidate sample, of the one or more candidate samples, with a highest score; and
performing, by the device, an action with regard to the query based on the candidate sample with the highest score.

16. The method of claim 15, wherein query is a search query, and
wherein the search query is associated with a navigation destination.

17. The method of claim 15, further comprising:
determining the one or more candidate samples based on a preposition included in the query.

18. The method of claim 15, further comprising:
determining the one or more candidate samples based on information associated with at least one of a user, account, or device associated with the query.

19. The method of claim 15, wherein performing the action comprises:
determining navigation information based on the candidate sample with the highest score; and
providing the navigation information toward a source of the query.

20. The method of claim 15, wherein the candidate sample is a selected candidate sample of the plurality of candidate samples based on respective scores of the plurality of candidate samples; and
wherein performing the action further comprises:
performing the action with regard to the selected candidate sample.

* * * * *